United States Patent [19]
Landwehrkamp

[11] Patent Number: 6,118,370
[45] Date of Patent: Sep. 12, 2000

[54] TWO-STAGE TEMPERATURE GAUGE WITH ADDED WINDING

[75] Inventor: Edgard Landwehrkamp, São Paulo, Brazil

[73] Assignee: Ford Motor Company, Dearborn, Mich.

[21] Appl. No.: 09/131,517

[22] Filed: Aug. 10, 1998

[51] Int. Cl.[7] ..................................................... B60Q 1/00
[52] U.S. Cl. ................... 340/449; 340/438; 340/870.17; 123/41.15
[58] Field of Search ..................................... 340/449, 438, 340/439, 458, 459, 870.17; 123/41.15

[56] References Cited

U.S. PATENT DOCUMENTS

| | | | |
|---|---|---|---|
| 2,139,385 | 12/1938 | Schwarze et al. | 340/449 |
| 3,622,975 | 11/1971 | Vanderberg | 340/449 |
| 3,761,731 | 9/1973 | Burgett et al. | 340/449 |
| 3,784,973 | 1/1974 | Burgett et al. | 340/449 |
| 3,909,779 | 9/1975 | Snyder | 340/52 F |
| 3,918,035 | 11/1975 | Eshraghian | 340/244 R |
| 3,979,743 | 9/1976 | Moore | 340/449 |
| 4,001,776 | 1/1977 | Carol, Jr. et al. | 340/52 F |
| 4,827,209 | 5/1989 | Tanaka et al. | 324/143 |
| 4,939,675 | 7/1990 | Luitje | 364/550 |
| 4,991,098 | 2/1991 | Dantzler | 364/424.01 |
| 5,063,344 | 11/1991 | Linke | 324/115 |
| 5,140,302 | 8/1992 | Hara et al. | 340/449 |
| 5,625,337 | 4/1997 | Medawar | 340/449 |

*Primary Examiner*—Nina Tong
*Attorney, Agent, or Firm*—Roger L. May; Mark L. Mollon

[57] ABSTRACT

A two-stage temperature gauge for a vehicle indicates whether engine temperature is normal or overheated. The gauge registers "normal" when the vehicle engine temperature is at or below a threshold value and registers "hot" when the vehicle engine temperature exceeds the threshold value. A circuit (10) for operating the gauge has an input terminal (12) for receiving a signal from an electronic engine controller (14) representative of engine temperature for causing the gauge register either "normal" or "hot". An indicating lamp (28) connected to the input terminal (12) illuminates to also indicated an overheated engine condition.

9 Claims, 1 Drawing Sheet

6,118,370

TWO-STAGE TEMPERATURE GAUGE WITH ADDED WINDING

TECHNICAL FIELD OF THE INVENTION

The present invention relates generally to temperature gauges, and, more particularly, to circuitry for driving a temperature gauge and warning light.

BACKGROUND OF THE INVENTION

In automobile manufacturing it is desirable to control costs. Cost control efforts include developing universal components that can be used with a variety of vehicle models. A temperature gauge is an item that is adapted for use for different vehicle models by altering the bobbin windings and connections for the temperature signal provided by the vehicle. Typical temperature gauges today are linear devices wherein the scale pointer moves in proportion to the temperature. The scale itself may indicate a "cold" region and a "hot" region with a "normal" region in between. In some applications, however, it is desirable to have a gauge that registers on "normal" and "hot" along with a visual or audible alarm when the gauge registers "hot". Accordingly, it is desirable to adapt a temperature gauge for such an application.

SUMMARY OF THE INVENTION

The present invention is directed to overcoming one or more of the problems set forth above. Briefly summarized, according to one aspect of the present invention, a circuit for a two-stage temperature gauge for a vehicle has an input for receiving a signal representative of temperature. The gauge gives a first indication "normal" when the vehicle engine temperature is at or below a threshold value and gives a second indication "hot" when the vehicle engine temperature exceeds the threshold value and it overheated. A branch circuit is connected to the input for controlling the gauge so that the gauge gives the first and second indications. The circuit includes an indicating lamp connected to the input so that the lamp illuminates when the temperature exceeds the threshold value.

The circuit uses current limiting elements to limit inrush current to a coil which is responsible for the indication the gauge provides. Limited inrush current allows the gauge to give a "normal" reading within a controlled amount of time when the ignition is switched on and the system is warming up. When the temperature exceeds the threshold, a diode conducts shunting the current limiting elements causing an increase in current flow through the coil which causes the gauge to give a "hot" reading. At the same time, the indicating lamp lights.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
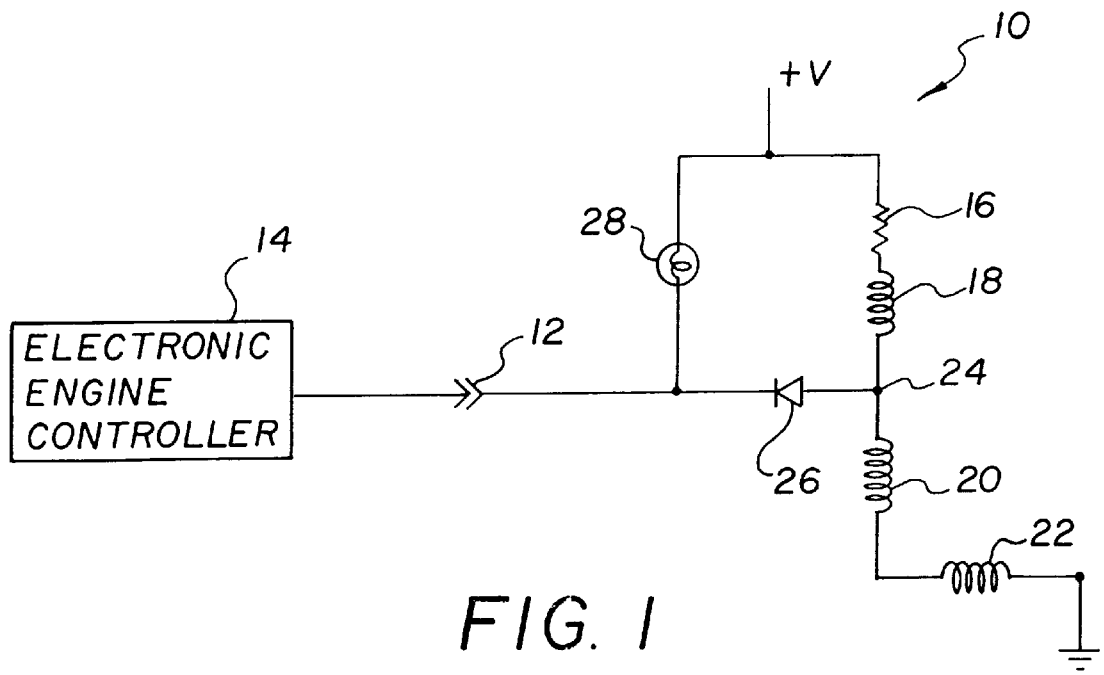
FIG. 1 is a schematic diagram of circuitry for a two-stage temperature gauge employing multiple coils according to the present invention.

Referring to FIG. 1, an electronic circuit 10 for a two-stage temperature gauge for visually indicating a vehicle engine temperature condition controls operation of the temperature gauge in the vehicle cluster. The gauge gives a first indication, such as "normal", when the vehicle engine temperature is at or below a threshold value and gives a second indication, such as "hot" when the vehicle engine temperature exceeds the threshold value and is thus overheated for normal operation. The circuit 10 has an input means, such as an input terminal 12, for receiving a signal from an electronic engine controller (EEC) 14 representative of temperature for causing the gauge to give one of the first and second indications.

Circuit 10 includes a branch circuit that has a resistor 16 and coils 18, 20 and 22 connected in series between a voltage source, +V, and ground. The voltage source is connected when the vehicle ignition is switched on and disconnected when the vehicle switch is turned off. Resistor 16 has one end connected to the controllable source of positive voltage, +V, and its other end connected to the first coil 18. The other end of coil 18 is connected at junction 24 to one end of coil 20 which has its other end connected to coil 22. Coil 22 is grounded completing the series branch circuit.

As configured in FIG. 1, coil 18 is responsible for causing indicator on the gauge to move and register either "normal" or hot" depending on engine temperature. When the vehicle ignition is switched on, inrush current to coil 18 is limited by resistor 16 and by coils 20 and 22 to provide smoother operation of the gauge and to limit indicator movement to the proper range of either "normal" or hot" as conditions warrant. Coil 20 or 22 could also be the operative coil for the gauge depending on the vehicle model or options. The circuit is manufactured with multiple coils and configured for the particular vehicle application rather than have a separate circuit for each application.

A diode 26 has its anode connected to junction 24 along with coils 18 and 20, and has its cathode connected to input terminal 12. A indicating lamp 28 is connected between +V and input terminal 12. The signal from EEC 14 comes from an open collector based switch so that input terminal 12 sees either an open circuit condition or ground.

There is an open circuit condition when the engine temperature is at or below the threshold, and a ground when the engine temperature exceeds the threshold. With an open circuit condition, lamp 28 is turned off and diode 26 is reversed biased. With an open circuit condition, current flows through the series circuit containing resistor 16 and coils 18, 20 and 22 to produce a "normal" indication on the gauge. With a ground condition, lamp 28 is turned on and diode 26 is forward biased forming a conductive path parallel to coils 20 and 22. This parallel path also draws current through coil 18 causing total current through coil 18 to increase enough to move the gauge indicator to "hot". When the ignition is switched off, a return magnet in the gauge resets the indicator.

Figure 2:
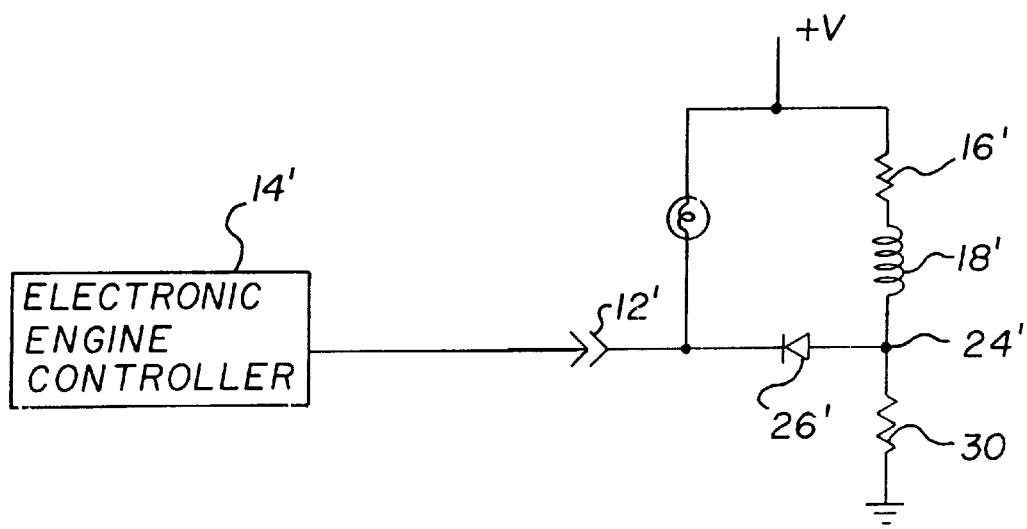
FIG. 2 is a schematic diagram similar to FIG. 1 but employing multiple resistors.

Referring to FIG. 2, where existing gauge windings are not used, a simplified branch circuit employing a resistor 30 instead of coils 20, 22 may be used. Resistor 30 limits inrush current to coil 18' and forms a voltage divider with resistor 16'. The voltage at junction 24' reverse biases diode 26' when there is an open circuit condition at input terminal 12'. During a ground condition, diode 26' is forward biased because of the voltage at junction 24' due to resistors 16' and 30.

It can now be appreciated that a circuit for a two-stage temperature gauge for a vehicle has been presented. The circuit has an input for receiving a signal representative of temperature. The gauge registers two conditions, "normal" when the vehicle engine temperature is at or below a threshold value and "hot" when the vehicle engine temperature exceeds the threshold value and is therefore overheated. A circuit is connected to the input for controlling the gauge so that the gauge registers the first and second conditions appropriately. The circuit also includes an indicating lamp connected to the input so that the lamp illuminates when the temperature exceeds the threshold value.

The circuit uses current limiting elements to limit inrush current to a coil which is responsible for the indication the gauge provides. Limited inrush current allows the gauge to give a "normal" reading when the system is turned on and the temperature is at or below the threshold temperature. When the temperature exceeds the threshold, a diode conducts shunting the current limiting elements causing an increase in current flow through the coil which causes the gauge to give a "hot" reading. At the same time, the indicating lamp lights.

The present invention can use a terminal pin from the existing EEC module. The pin is an open collector based switch. The temperature gauge and warning light are controlled through this pin from the EEC module. This configuration eliminates a temperature sensor from the vehicle thereby reducing EEC complexity. It provides a flat response over the "normal" range of the gauge.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A circuit for a two-stage temperature gauge, said gauge giving a first indication when the temperature is at or below a threshold value and giving a second indication when the temperature exceeds the threshold value, said circuit comprising:
    input means for receiving a signal representative of temperature for causing the gauge to give one of the first and second indications, said input means including a terminal;
    branch circuit means connected to said input means for controlling the gauge so that the gauge gives the first and second indications, said branch circuit means including a diode having an anode connected to said branch circuit means and a cathode connected to said terminal, said branch circuit including a resistor having a first end coupled to a controllable source of positive voltage, a first coil with a first end connected to a second end of said resistor and with a second end connected to said anode of said diode, a second coil with a first end connected to said anode of said diode and with a second end coupled to ground, and a third coil with a first end connected to said second end of said second coil and with a second end connected to ground; and
    an indicating lamp connected to said input means, said lamp illuminating when the temperature exceeds the threshold value.

2. A circuit, as set forth in claim 1, wherein said resistor and second and third coils limit inrush current flow through said first coil when said controllable source of positive voltage is switched on causing current to flow in said branch circuit so that said gauge gives the first indication.

3. A circuit, as set forth in claim 1, wherein said diode conducts when the temperature exceeds the threshold value, said diode shunting said second and third coils increasing current flow through said first coil driving said gauge to give the second indication.

4. A circuit for a two-stage temperature gauge for a vehicle, said gauge giving a first indication when the vehicle engine temperature is at or below a threshold value and giving a second indication when the vehicle engine temperature exceeds the threshold value, said circuit comprising:
    an input terminal for receiving a signal representative of temperature for causing the gauge to give one of the first and second indications;
    a resistor having a first end coupled to a controllable source of positive voltage;
    a first coil having a first end connected to a second end of said resistor and having a second end;
    a diode having an anode connected to said second end of said first coil and a cathode connected to said input terminal;
    a second coil having a first end connected to said anode of said diode and having a second end coupled to ground; and
    an indicating lamp connected to said input terminal and a source of positive voltage, said lamp illuminating when the temperature exceeds the threshold value.

5. A circuit, as set forth in claim 4, wherein said resistor and second coil limit inrush current flow through said first coil when said controllable source of positive voltage is switched on causing current to flow through said first coil so that said gauge gives the first indication.

6. A circuit, as set forth in claim 5, wherein said diode conducts when the temperature exceeds the threshold value, said diode shunting said second coil increasing current flow through said first coil driving said gauge to give the second indication.

7. A circuit for a two-stage temperature gauge for a vehicle, said gauge giving a first indication when the vehicle engine temperature is at or below a threshold value and giving a second indication when the vehicle engine temperature exceeds the threshold value, said circuit comprising:
    an input terminal for receiving a signal representative of temperature for causing the gauge to give one of the first and second indications;
    a first resistor having a first end coupled to a controllable source of positive voltage and having a second end;
    a coil having a first end connected to a second end of said first resistor and having a second end;
    a diode having an anode connected to said second end of said coil and a cathode connected to said input terminal;
    a second resistor having a first end connected to said anode of said diode and having a second end connected to ground; and
    an indicating lamp connected to said input terminal and said controllable source of positive voltage, said lamp illuminating when the temperature exceeds the threshold value.

8. A circuit, as set forth in claim 7, wherein said resistors limit inrush current through said first coil when said source of positive voltage is switched on to cause current to flow through said coil so that said gauge gives the first indication.

9. A circuit, as set forth in claim 7, wherein the diode conducts when the temperature exceeds the threshold value, the diode shunting the second resistor increasing current flow through the coil driving the gauge to give the second indication.

* * * * *